US012449963B2

United States Patent
Lu

(10) Patent No.: US 12,449,963 B2
(45) Date of Patent: Oct. 21, 2025

(54) INTERACTIVE MEDIA PLAFORM CONTENT

(71) Applicant: Lemon Inc., Grand Cayman (KY)

(72) Inventor: Jacky Yi Han Lu, Culver City, CA (US)

(73) Assignee: Lemon Inc., Grand Cayman (KY)

( * ) Notice: Subject to any disclaimer, the term of this patent is extended or adjusted under 35 U.S.C. 154(b) by 0 days.

(21) Appl. No.: 18/514,573

(22) Filed: Nov. 20, 2023

(65) Prior Publication Data

US 2025/0165131 A1    May 22, 2025

(51) Int. Cl.
*G06F 3/0484*    (2022.01)
*G06F 3/0346*    (2013.01)
*G06F 3/04845*   (2022.01)

(52) U.S. Cl.
CPC ........ *G06F 3/04845* (2013.01); *G06F 3/0346* (2013.01)

(58) Field of Classification Search
CPC .. G06F 3/0346; G06F 3/04842; G06F 3/0481; G06F 3/04845
See application file for complete search history.

(56) References Cited

U.S. PATENT DOCUMENTS

| 9,743,124 B2 * | 8/2017 | Green ................. H04N 21/8456 |
| 2014/0047465 A1 * | 2/2014 | Zaslavsky .......... H04N 21/4751 725/12 |
| 2014/0149884 A1 | 5/2014 | Flynn, III et al. |
| 2014/0368442 A1 | 12/2014 | Vahtola |
| 2016/0202879 A1 | 7/2016 | Chen et al. |
| 2016/0210660 A1 * | 7/2016 | Flynn ....................... H04W 4/23 |
| 2017/0131851 A1 * | 5/2017 | Thompson ......... H04N 21/2665 |
| 2018/0014052 A1 * | 1/2018 | Venkatraman ..... H04N 21/2393 |
| 2021/0345017 A1 | 11/2021 | Lewis et al. |
| 2023/0262279 A1 * | 8/2023 | Fogaros ............. H04N 21/4126 725/110 |
| 2023/0283864 A1 | 9/2023 | Loghmani et al. |

FOREIGN PATENT DOCUMENTS

CN        104915857 A  *  9/2015  ............. G06Q 30/02

OTHER PUBLICATIONS

International Search Report and Written Opinion for International Application No. PCT/SG2024/050742, mailed Jan. 21, 2025, 11 pages.

* cited by examiner

*Primary Examiner* — Matthew A Eason
*Assistant Examiner* — Scott D Au
(74) *Attorney, Agent, or Firm* — Fish & Richardson P.C.

(57) ABSTRACT

A method of displaying content on a media platform includes obtaining the content for display to a user device. The method also includes applying an interactive element embedded into the content to interact with the user device, thereby allowing the interactive element to react on demand while displaying the content on the user device. A method of obtaining content from a media platform includes requesting the content for display on a user device, and displaying the content on the user device, during which an interactive element embedded in the content reacts on demand in response to sensing by one or more sensors of the user device. A system is configured to provide content on a media platform. The user device is configured to display the content from media platform.

13 Claims, 7 Drawing Sheets

INTERACTIVE MEDIA PLAFORM CONTENT

FIELD

This disclosure generally relates to content on a media platform. More specifically, this disclosure relates to generation, obtaining, and display of content on a media platform.

BACKGROUND

Media platforms or applications allow users to upload, view, and share media (e.g., to watch videos and/or images). Media platforms can also allow for sharing of content between users. Such content may include, but is not limited to, the media itself, comments on media, achievements by the user on the media platform, a user's status, or the like. A media platform can generate the content in one or more shareable format, such as in the form of a shared post, a shared story, or the like. The shareable formats allow for easier sharing between users on the media platform. In some instances, media uploaded and shared on the platform (e.g., an image or video uploaded onto the media platform by the user and then shared) may be confused with content generated on the media platform.

SUMMARY

In an embodiment, a method is directed to displaying content on a media platform. The method includes obtaining the content for display to a user device. The method also includes applying an interactive element embedded into the content to interact with the user device, thereby allowing the interactive element to react on demand while displaying the content on the user device.

In an embodiment, the interactive element dynamically reacts on demand.

In an embodiment, the interactive element dynamically reacts on demand in response to changes in real-time sensing by the user device. The changes in the real-time sensing of the user device are caused by a user interaction with the user device.

In an embodiment, the interactive element reacting on demand is in response to sensing by one or more sensors of the user device.

In an embodiment, the interactive element reacting on demand is in real-time to the sensing by the one or more sensors.

In an embodiment, the content containing one or more components that do not react to the sensing by the one or more sensors.

In an embodiment, the interactive element reacts on demand in response to changes in the sensing by the one or more sensors.

In an embodiment, the interactive element reacting on demand is in response to motion sensing by one or more motion sensors of the user device.

In an embodiment, the obtaining of the content includes generating the content on the media platform.

In an embodiment, the interactive element is embedded into the content to form an integral object.

In an embodiment, the interactive element is embedded as an overlay.

In an embodiment, the interactive element includes an interactive visual component. The reaction on demand of interactive element reacting includes changing one or more visual properties of the interactive visual component of the interactive element.

In an embodiment, the interactive visual component is one or more of a shimmer effect, a parallax effect, a pulsing glow effect, and a color scheme effect.

In an embodiment, a method is directed to obtaining content from a media platform. The method includes requesting the content for display on a user device, the user device including one or more sensors. The method also includes displaying the content on the user device, during which an interactive element embedded in the content reacts on demand in response to sensing by the one or more sensors.

In an embodiment, the method includes sensing, with the one or more sensors, for a user interaction with the user device. The interactive element embedded in the content reacts on demand in response to the sensing by the one or more sensors of the interaction of the user with the user device.

In an embodiment, the interactive element dynamically reacts on demand.

In an embodiment, the interactive element dynamically reacts on demand in response to changes in real-time sensing by the user device. The changes in the real-time sensing of the user device are caused by a user interaction with the user device.

In an embodiment, the content containing one or more visual components that do not react to the sensing by the one or more sensors.

In an embodiment, the one or more sensors of the user device include one or more motion sensors. The interactive element reacts on demand in response to motion sensing by the one or more motion sensors of the user device.

In an embodiment, the interactive element is embedded into the content to form an integral object. The user device receives the integral object from the media platform.

In an embodiment, the interactive element includes an interactive visual component. The reacting of the interactive element on demand includes changing of one or more visual properties of the interactive visual component of the interactive element.

In an embodiment, the interactive element is embedded as an overlay.

In an embodiment, the interactive visual component is one or more of a shimmer effect, a parallax effect, a pulsing glow effect, and a color scheme effect.

In an embodiment, a system is configured to provide content on a media platform. The system includes a memory configured to store data, and a processor configured to read the data from the memory. The processor further configured to obtain the content for display to a user device and apply an interactive element embedded into the content to interact with the user device, thereby allowing the interactive element to react on demand while displaying the content on the user device.

In an embodiment, the processor of the system is further configured to provide the content embedded with interactive element to the display device.

In an embodiment, a non-transitory computer-readable storage medium has a computer program stored thereon. The computer program, when executed by a processing device, performs steps that include obtaining content for display to a user device, and applying an interactive element embedded into the content to interact with the user device, thereby allowing the interactive element to react on demand while displaying the content on the user device.

In an embodiment, a user device is for displaying content from a media platform. The user device includes a memory configured to store data, one or more sensors, and a processor configured to read the data from the memory. The processor is further configured to request the content for display on a user device, and display the content on the user device, during which an interactive element embedded in the content reacts on demand in response to sensing by the one or more sensors of the user device.

In an embodiment, a non-transitory computer-readable storage medium has a computer program stored thereon. The computer program when, executed by a processing device, performs steps that include requesting content from a media platform for display on a user device, the user device having one or more sensors, and displaying the content on the user device, during which an interactive element embedded in the content reacts on demand in response to sensing by the one or more sensors.

DRAWINGS

The accompanying drawings illustrate various embodiments of systems, methods, and embodiments of various other aspects of the disclosure. Any person with ordinary skills in the art will appreciate that the illustrated element boundaries (e.g. boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Non-limiting and non-exhaustive descriptions are described with reference to the following drawings. The components in the figures are not necessarily to scale, emphasis instead being placed upon illustrating principles. In the detailed description that follows, embodiments are described as illustrations only since various changes and modifications may become apparent to those skilled in the art from the following detailed description.

Like numbers represent like features.

DETAILED DESCRIPTION

Figure 1:
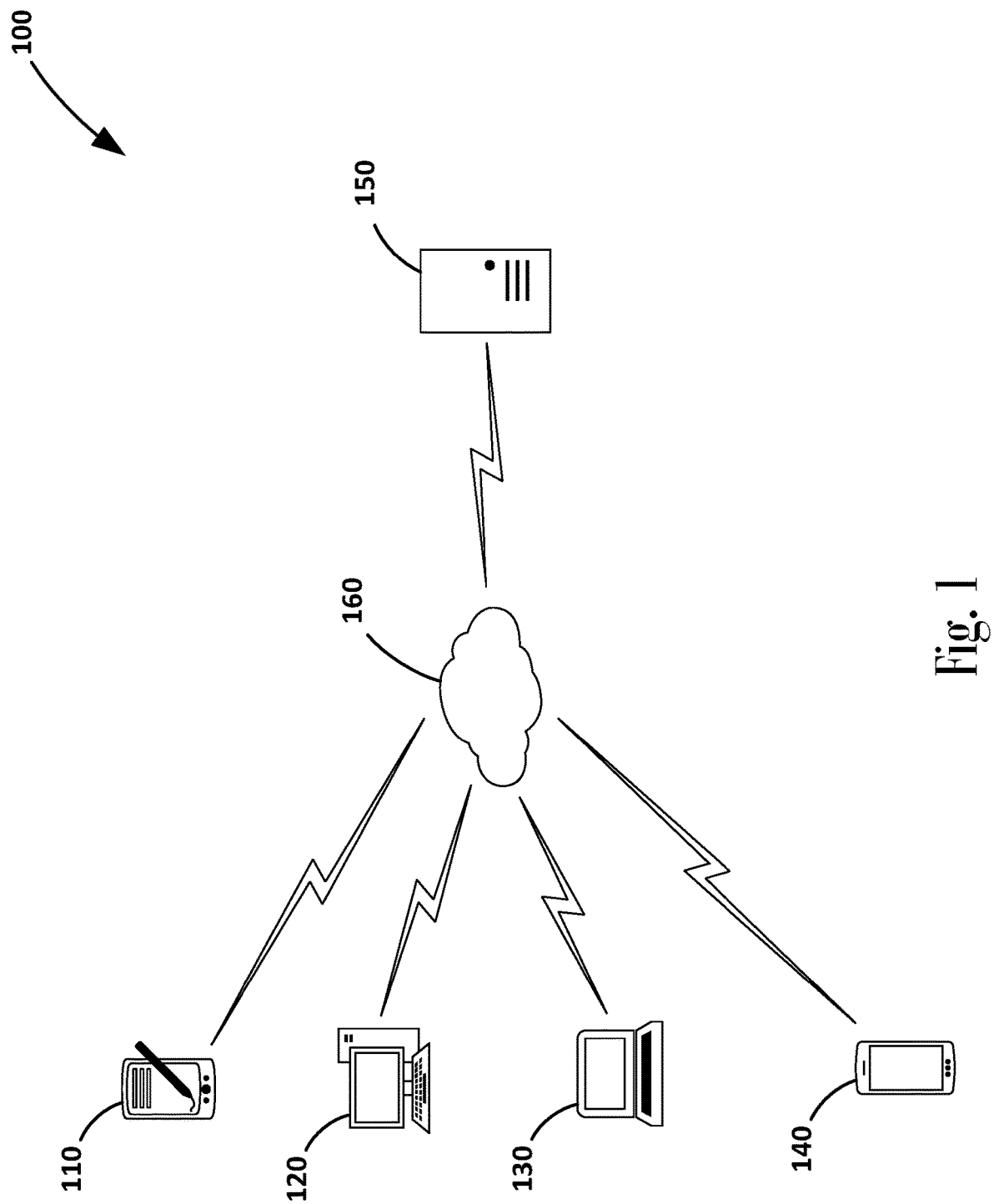
FIG. 1 shows a schematic diagram of an embodiment of a system for implementing a media platform to generate and provide content for display on a user device.

In the following detailed description, particular embodiments of the present disclosure are described herein with reference to the accompanying drawings, which form a part of the description. In this description, as well as in the drawings, like-referenced numbers represent elements that may perform the same, similar, or equivalent functions, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not intended to be limiting. Other embodiments may be utilized, and other changes may be made, without departing from the spirit or scope of the subject matter presented herein. It is to be readily understood that the aspects of the present disclosure, as generally described herein and illustrated in the drawings, may be arranged, substituted, combined, separated, and designed in a wide variety of different configurations, all of which are explicitly contemplated herein.

As used herein, the terms "dynamically reacts" and "reacts dynamically" refers to reacting in a correlative manner. For example, when a feature reacts dynamically to sensing, the feature reacts to each change in the sensing. For example, each substantial change in the input causes in respective change in the feature, such the reacting is synchronous with the changes in the input.

FIG. 1 illustrates an example system 100 in which a media platform may be implemented to generate and provide content for display on a user device, in accordance with at least some embodiments described herein.

The system 100 may include terminal devices 110, 120, 130, and 140, a network 160, and a server 150. It is to be understood that FIG. 1 only shows illustrative numbers of the terminal devices, the network, and the server. The embodiments described herein are not limited to the number of the terminal devices, the network, and/or the server described. That is, the number of terminal devices, networks, and/or servers described herein are provided for descriptive purposes only and are not intended to be limiting.

In accordance with at least some example embodiments, the terminal devices 110, 120, 130, and 140 may be various electronic devices. The various electronic devices may include but not be limited to a mobile device such as a smartphone, a tablet computer, an e-book reader, a laptop computer, a desktop computer, and/or any other suitable electronic devices. The terminal devices 110, 120, 130, and 140 may include an application (or application programing interface (API) connection), web-accessing program, e.g., browser, or other Internet enabled program for accessing the server 150 for transmitting and/or receiving data from the server 150.

In accordance with at least some example embodiments, the network 160 may be a medium used to provide a communications link between the terminal devices 110, 120, 130, 140 and the server 150. The network 160 may be the Internet, a local area network (LAN), a wide area network (WAN), a local interconnect network (LIN), a cloud, etc. The network 160 may be implemented by various types of connections, such as a wired communications link, a wireless communications link, an optical fiber cable, etc.

In accordance with at least some example embodiments, the server 150 may be a server for providing various services to users using one or more of the terminal devices 110, 120, 130, and 140, for example, for hosting a media platform. The server 150 may be implemented by a distributed server cluster including multiple servers or may be implemented by a single server.

A user may use one or more of the terminal devices 110, 120, 130, and 140 to interact with the server 150 via the network 160. Various applications or localized interfaces thereof, such as social networking or media applications, gaming applications, or the like, may be installed on the terminal devices 110, 120, 130, and 140. The user may use the media platform for networking, socializing, gaming, browsing, searching, or the like.

Each user may be associated with a user profile, which may be stored on a user management module on the media platform. A user profile may include one or more attributes, which may include, but not limited to, demographic information, geography or locations, personas, interests, personal preferences, lifestyles, or the like. The server 150 may also be configured to track, monitor, and/or store data related to the user's online actions on the media platform. The tracked data may include, but not limited to, user interactions with various objects, pages, or other users, "liking" or "disliking" other users' comments or social interactions, pages, groups, businesses, groups, locations, checking in to various locations, joining groups, or events, or the like. Characteristics of a user profile can include one of more of features of the attributes and the tracked data of the user profile.

It is to be understood that software applications according to the embodiments described herein may be performed by the server 150 and/or the terminal devices 110, 120, 130, and 140 (which may be referred to herein as user devices). Accordingly, the apparatus for the software applications may be arranged in the server 150 and/or in the terminal devices 110, 120, 130, and 140.

It is further understood that the terminal device 110, 120, 130, and 140 and/or the server 150 may each include one or more processors, a memory, and a storage device storing one or more programs. The terminal device 110, 120, 130, and 140 and/or the server 150 may also each include an Ethernet connector, a wireless fidelity receptor, etc. The one or more programs, when being executed by the one or more processors, may cause the one or more processors to perform the method(s) described in any embodiments described herein. Also, it is to be understood that a computer readable non-volatile medium may be provided according to the embodiments described herein. The computer readable medium stores computer programs. The computer programs are used to, when being executed by a processor, perform the method(s) described in any embodiments described herein.

Figure 2:
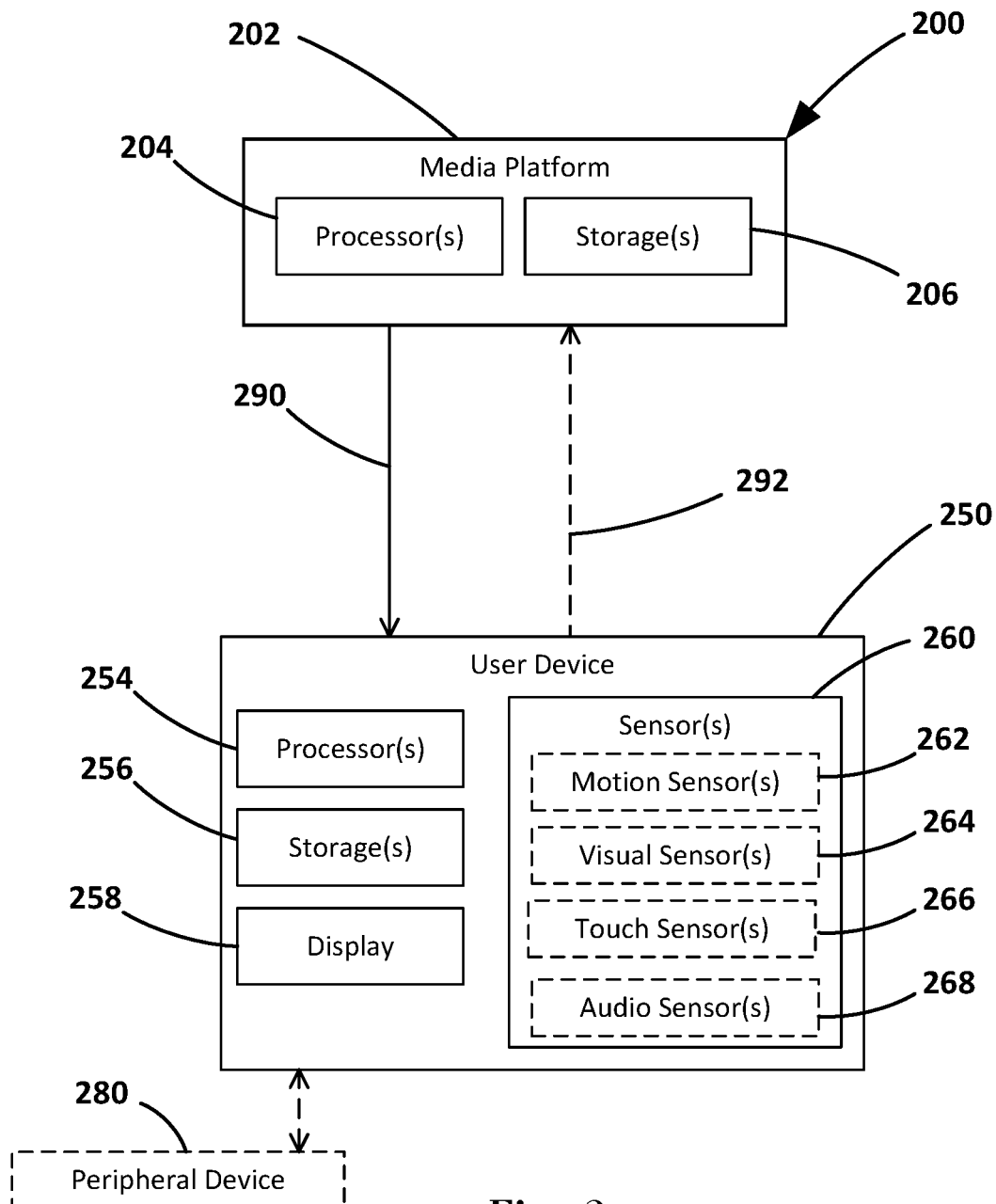
FIG. 2 shows a schematic diagram of an embodiment of a system for providing content for display on a user device.

FIG. 2 is a schematic diagram of a system 200 for providing content for display on a user device 250, in accordance with at least some embodiments described herein.

The system 200 includes a media platform 202. The media platform 202 includes one or more processors 204 and one or more storage 206. The user device 250 includes one or more processors 254, one or more storage 256, and a display 258. The user device 250 also includes one or more sensor(s) 260, which are discussed in more detail below. For example, the media platform 202 in an embodiment may be the server 150 in FIG. 1. For example, the user device 250 in an embodiment may be one of the terminal devices 110, 120, 130, 140 in FIG. 1.

The media platform 202 provides content 290 to the user device 250 for display to a user of the user device 250. For example, the user device 250 may access and view the content 290 on the media platform 202 (e.g., display the content on the display 258). The content 290 is generated on the media platform 202. An interactive element is embedded in the content 290 by the media platform 202. The interactive element embedded in the content 290 is configured to interact with the user device 250 while the content 290 is being displayed on the user device 250. The interactive element is configured to react on demand while the content 290 is being displayed on the user device 250.

The user device 250 includes the sensor(s) 260 for sensing by the user device 250. For example, the sensor(s) 260 may include, but is not limited to, motion sensor(s) 262 (e.g., accelerometer sensor(s), gyroscope sensor(s), vibration sensor(s), etc.), visual sensor(s) 264 (e.g., camera(s), infrared sensor(s), etc.), touch sensor(s) 266 (haptic sensor(s), touchscreen sensor(s), etc.), audio senor(s) 268 (e.g., microphone, etc.), etc.

The user device 250 may use the sensor(s) 260 to sense for user interaction with the user device 250. The user interaction sensed by the user device 250 and the sensor(s) 260 is not particularly limited. For example, the sensor(s) 260 may sense user interaction by detecting for changes in the position of the user device 250 (e.g., motion sensor(s) 262 and/or visual sensor(s) 264 detecting for moving, tiling, or the like of the user device 250 by the user). For example, the sensor(s) 260 may sense user interaction by visually detecting for movement of the user near the user device 250 (e.g., visual sensor(s) 264 detecting for movement of a user in the environment of the user device 250). For example, the sensor(s) 260 may sense for touch of the user (e.g., touch sensor(s) 266 detecting for tapping, swiping, or the like on the user device 250 by the user). For example, the sensor(s) 260 may sense user interaction by detecting for a voice of the user (e.g., sound sensor(s) 268 detecting for sound created by the user, such as a voice of the user).

In an embodiment, the user device 250 includes the motion sensor(s) 262 configured to detect movement of the user device 250 (e.g., movement of the user device 250 by the user). For example, the motion sensor(s) 262 may detect for tilting of the user device 250 (e.g., by the user).

As shown in FIG. 2, the sensor(s) 260 can be integral sensors of the user device 250. In an embodiment, the user device 250 can include one or more peripheral sensors used to sense user interaction (e.g., one or more of sensor(s) in FIG. 2 being a peripheral sensor). The user device 250 may be connected (e.g., wirelessly connected, via wired connection) to one or more peripheral devices 280. A peripheral sensor is a sensor of a peripheral device 280. Examples of peripheral devices 280 can include, but are not limited to, a smartwatch, a headset (e.g., a virtual reality headset or an alternative reality headset), a user motion tracking device, or the like.

While the content 290 is being displayed on the user device 250 (e.g., on the display 258 of the user device 250), the embedded interactive element reacts on demand. The interactive element reacts on demand in response to sensing by the sensor(s) 260 of the user device 250. For example, the interactive element is configured to react on demand to user interactions with the user device 250 as detected by the sensor(s) 260 of the user device 250. In one embodiment, the interactive element reacts to changes in the sensing by the one or more sensors 260.

The interactive element can be configured to dynamically react on demand. For example, the interactive element adjusts with the changes in the sensing of the user device 250. In one non-limiting example, the interactive element reacts dynamically on demand by changing in a corresponding manner with changing in the sensing of the user device 250. For example, the interactive element changes with changes in the sensing of the user device 250. The interactive element can react in real-time to the sensing of the user device 250 (e.g., reacts in real-time to the sensing of the sensor(s) 260).

The sensor(s) 260 can generate sensor data (e.g., motion sensor data, visual sensor data, touch sensor data, audio sensor data, etc. or a combination thereof) that corresponds with the sensing by the user device 250. As the content is being displayed on the user device 250, the sensor data is utilized by the interactive element embedded in the content. The interactive element reacts on demand to the sensor data. For example, the interactive element can dynamically react to the sensor data (e.g., the interactive element changes with changes in the sensor data). For example, the interactive element can react in real-time to the real-time sensor data provided by the sensors.

The configuration of the embedded interactive element can allow for the user to interact with the user device 250 that changes the sensing by the sensor(s) of the user device 250, which causes real-time changes in the interactive element embedded in the displayed content. The configuration of the embedded interactive element can allow the user to manipulate/interact with the user device 250 in a controlled manner that causes change in the interactive element embedded in the displayed content in real-time. For example, the user's interactions with the user device 250 occurs on demand such that the change in the interactive element cannot be confused with a previous video of a reaction of an interactive element. In one embodiment, the embedded interactive element may be used to authenticate the content as content generated on the media platform.

In an embodiment, the interactive element is an interactive visual component. The interactive visual component reacts on demand to the sensing of the user device 250 as discussed herein. The interactive visual component can be embedded as an overlay of the content. In one example, the content to be displayed on the user device is an image and/or video, and the interactive visual component is embedded as an overlay over the image and/or video. The interactive visual component reacts by changing one or more visual properties of the interactive visual component. Example visual properties may include, but are not limited to, reflection angle, perspective, brightness, color, shape, etc. of the interactive visual component.

In an embodiment, an interactive visual component may be one or more of, but are not limited, a shimmer effect, a parallax effect, a pulsing glow effect, and a color scheme effect. A shimmer effect can provide a light reflection on an area that changes on demand (e.g., light reflection off surface changes with the sensing of the user device 250). A shimmer effect may also be referred to as a gloss effect. In some non-limiting examples, the area of the shimmer effect may have a metallic or foil appearance or a glass plane appearance as embedded in the content. A parallax effect can provide an area in which the displayed perspective of the area changes on demand (e.g., perspective changes with the sensing of the user device 250). A pulsing glow effect can provide a pulsing glow that changes on demand (e.g., pulsing speed, brightness, etc. changes with the sensing of the user device 250). It should be appreciated that other types of suitable visual effects than those listed may be used for the interactive visual component.

The operation of the interactive element may occur on the media platform 202 (e.g., using the processor 204) or on the user device 250 (e.g., using processor 254). In one example embodiment, the reacting of the interactive element occurs on the user device 250. The interactive element utilizes the user device 250 to react on demand to the sensing of the user device 250 (e.g., the processor(s) 254 of user device 250 utilized in operating the interactive element in the displayed content to react on demand to the sensing of the user device 250). In another example embodiment, the operation of the interactive element occurs on the media platform 202. For example, the user device 250 can provide sensor data 292 to the media platform 202, and the interactive element utilizes the media platform 202 to react on demand to the sensor data (e.g., the processor(s) 204 of media platform 202 utilized in operating the interactive element based on the sensor data from the user device 250), and the content is displayed by the user device 250 with the embedded interactive element reacting to the sensing by the user device 250.

Figure 3A:
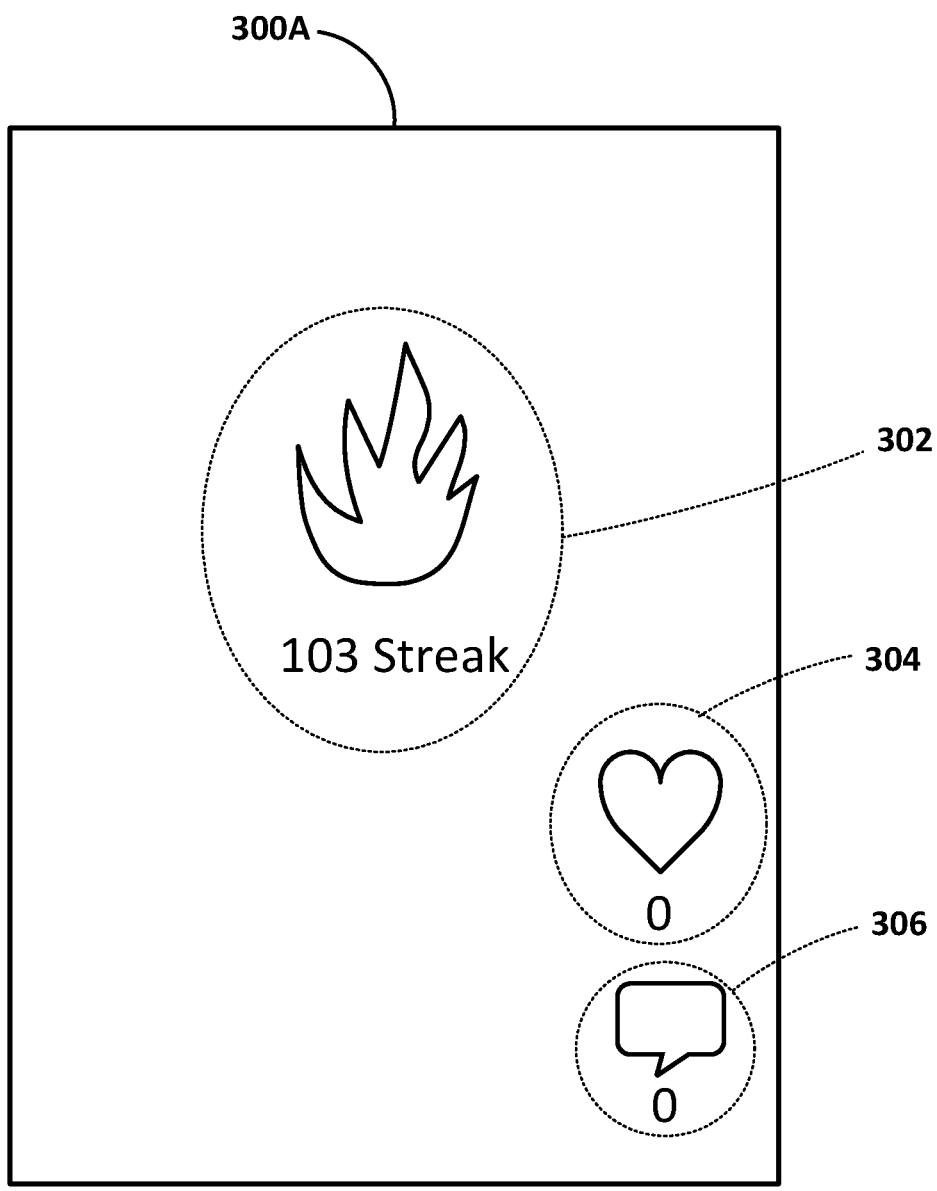
FIG. 3A shows an embodiment of content obtained for display on a user device.
Figure 3B:
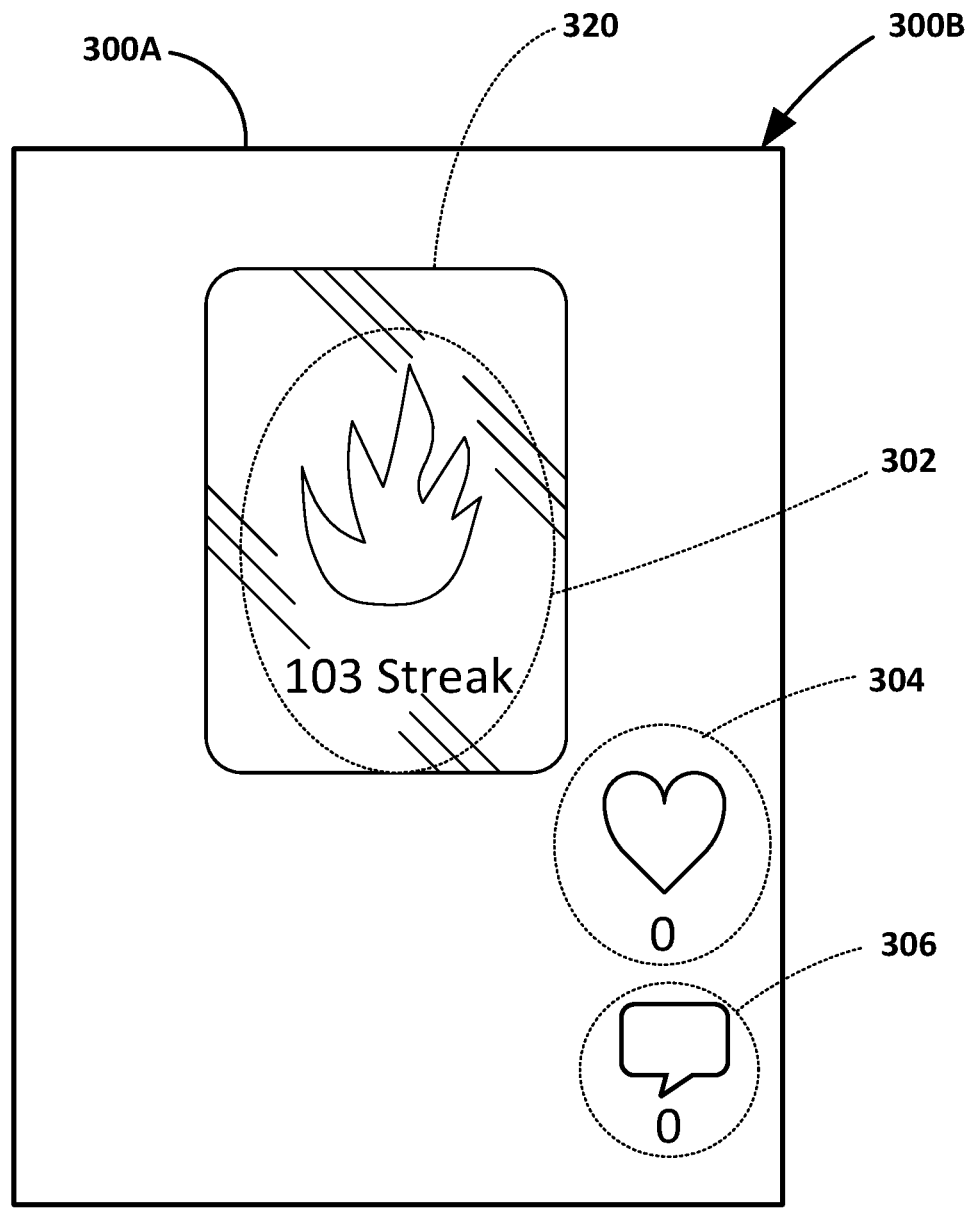
FIG. 3B shows an embodiment of the content in FIG. 3A with an embedded interactive element.
Figure 3C:
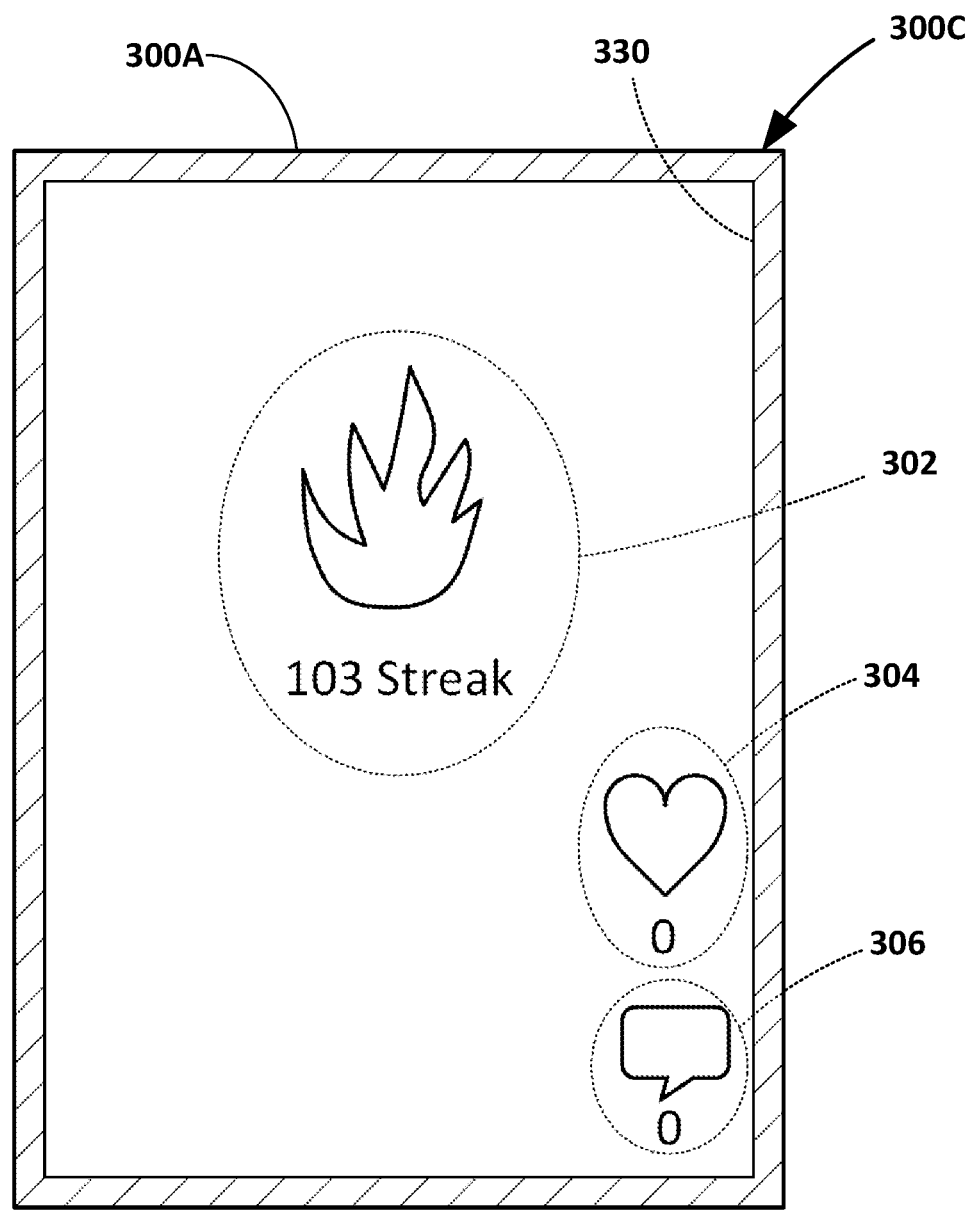
FIG. 3C shows another embodiment of the content in FIG. 3A with an embedded interactive element.

FIGS. 3A-3C illustrate embedding an interactive element in content, in accordance with at least some embodiments described herein. Short dashed lines are used to for some reference lines in FIGS. 3A-3C to prevent confusion of the reference lines with illustrated features.

FIG. 3A illustrates content 300A for display on a user device (e.g., user device 250) to a user. The content 300A is generated on a media platform (e.g., media platform 202). In the illustrated embodiment, the content 300A is social media content for use on a social media platform. In another embodiment, the content 300A can be, but is not limited to, a social media post, a sharable status, a story, etc. on the media platform.

The content 300A is generated on the media platform. The content 300A may be generated based on a user profile of the user device (e.g., a user profile of the user). For example, the content 300A can include one or more graphic components 302 generated based on the user profile of the user device. As shown in FIG. 3A, a non-limiting example of the graphic component 302 is a streak status of the user profile (e.g., posting streak, log-in streak, etc. by the user). Other non-limiting examples of the graphic component(s) 302 may include, but are not limited to, a friendship status (e.g., status/length of friendship between user profiles, etc.), a story (e.g., summary of a user profile's history, of history of a subject, a history of a channel, etc. on the media platform), shared content from another user on the media platform, etc. It should be appreciated that the content 300A may include different type(s) of graphic component(s) 302 than those discussed above.

The content 300A may also include one or more sharing components 304, 306. The sharing components 304, 306 are sharing characteristics for the content 300A on the media platform. The sharing components 304, 306 can change as the content 300A is shared on the media platform. In the illustrated example, the sharing components 304, 306 include a first sharing component 304 that illustrates a number of "likes" of the content 300A on the media platform and a second sharing component 304 that illustrates a number of user comments on the content 300A on the media platform. It should be appreciated that the content 300A may include different type(s) of sharing component(s) 304, 306 than those discussed above. The component(s) 302, 304, 306 of the content do not react to the sensing by the sensor(s) of the user device (e.g., are not configured to react to sensing by the one or more sensor(s) of the user device.

FIG. 3B illustrates an interactive element 320 embedded into the content 300A, in accordance with at least some embodiments described herein. The interactive element 320 is embedded in the content 300A. The content 300A with the embedded interactive element 320 is referred to as content 300B. For example, content 300B may be referred to as an interactive content. The interactive element 320 is embedded into the content 300A forming an integral object (e.g., forming the content 300B in FIG. 3B). In an embodiment, a media platform may generate content 300A and then adds an interactive element 320 to the content 300A to form the content 300B. In another embodiment, a media platform may generate content 300B directly, in which the content 300A as generated includes the embedded interactive element 320.

In FIG. 3B, the interactive element 320 is a shimmer effect. The shimmer effect is configured to provide a shimmer (e.g., gloss) in the content 300B. In the illustrated embodiment, the shimmer effect is generally transparent such that the shimmer does not impact the content 300A in which the shimmer effect is embedded. For example, as the shimmer effect is generally transparent, the shimmer effect does not change the contents of the content 300B (e.g., does not change any of the shapes of the components 302, 304, 306 in the content 300A, does not obscure any of the components 302, 304, 306 of the content 300A). For example, the transparent shimmer effect in FIG. 3B may appear as a transparent glass shimmer disposed on top of the content 300A.

In the content 300B, the interactive element 320 can be embedded/disposed to cover at least one component 302, 304, 306 of the content 300A. In the illustrated embodiment, the interactive element 320 is provided to cover at least one graphic component 302 of the content 300A. The interactive element 320 covers a portion of the content 300A (e.g., covers less than the entire area of content 300A). In another embodiment, the interactive element 300 may cover the entire area of content 300A.

FIG. 3C illustrates an example of an interactive element 330 embedded in the content 300A, in accordance with at least some embodiments described herein. The interactive element 330 is embedded in the content 300A. For example, content 300C may be referred to as an interactive content. The interactive element 330 is embedded into the content 300A to form an integral object (e.g., forming the content 300C in FIG. 3C). As similarly discussed above with respect to FIG. 3B, the content 300C may be formed by first generating the content 300A separate from the interactive element 330 or by generating the content 300C directly In FIG. 3C, the interactive element 330 is a shimmer effect. The shimmer effect is configured to provide a shimmer (e.g., glossiness) in the content 300C. In the illustrated embodiment, the shimmer effect is opaque such that the shimmer would cover any features/components that it overlaps of content 300A. In FIG. 3C, the interactive element 330 is provided so as to not overlap any of the components 302, 304, 306 in the content 300A, as the shimmer effect of the interactive element 330 is opaque. As the opaque shimmer effect is not provided over any of components of the content 300A, the embedded opaque shimmer effect does not change any components/features of the content 300A (e.g., does not change any of the shapes of the components 302, 304, 306 in the content 300A, does not obscure any of the components 302, 304, 306 of the content 300A). For example, the opaque shimmer effect in FIG. 3C may appear as a metallic shimmer on the content 300A.

In an embodiment, an interactive element embedded in the content may include an interactive sound component. The interactive sound component can be configured to interact with the user device and to react on demand while the content is being displayed. The interactive sound component may be configured to react on demand as discussed herein for the interactive element. The interactive sound component can have one or more features that change on demand with the sensing of the user device. Features of an interactive sound component that change on demand may include, but are not limited to, pitch, loudness, volume, beat, etc. In an embodiment, the interactive sound component can provide a non-visual interactive element in the displayed content that reacts on demand to the sensing by the user device. For example, the non-visual interactive component/element may allow for a user to non-visually confirm that the currently displayed content was generated on the media platform. In an embodiment, the interactive element may be provided without a visual component (i.e., the interactive element is an interactive sound component, the interactive element not including an interactive visual component). The interactive sound component may allow for the user to confirm the displayed content as generated on the media platform without incorporating a visual element into the content.

Figure 4:
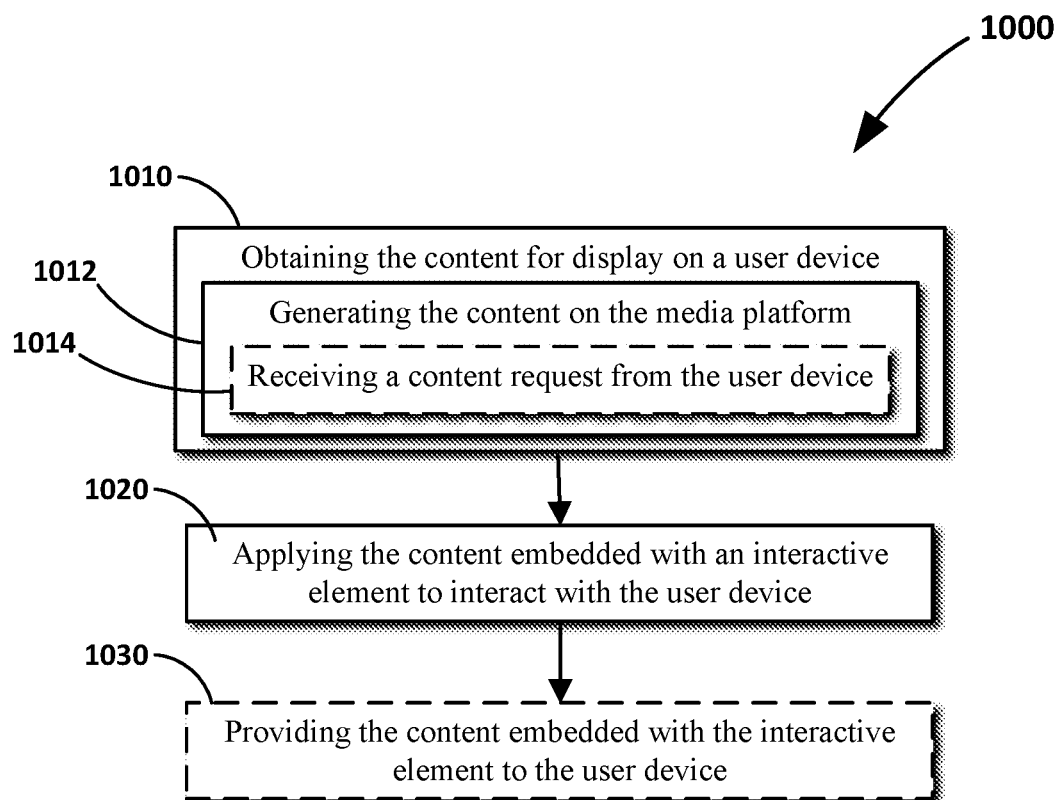
FIG. 4 shows a block flow chart for an embodiment of a process of displaying content on a media platform.

FIG. 4 is a flow chart illustrating an example process 1000 for displaying content on a media platform, in accordance with at least some embodiments described herein. Processing flow 1000 may include various operations, functions, or actions as illustrated by one or more of blocks 1010, 1012, 1020, 1030. These various operations, functions, or actions may, for example, correspond to software, program code, or program instructions executable by a processor that causes the functions to be performed. Processing may begin at block 1010.

At block 1010, a media platform obtains content for display on a user device. For example, as illustrated in the embodiment of FIG. 2, a media platform 202 can be implemented by the system 200 for providing content 290 for display on the user device 250.

In an embodiment, the media platform obtaining the content at block 1010 includes generating the content on the media platform at block 1012. At block 1012, the content is generated on the media platform and an interactive element embedded in the content. As similarly discussed above with respect to FIG. 3B, the media platform may generate content separately and then embed an interactive element into the content or the content may be generated on the media platform to already include the embedded interactive element. The content may be generated based on a user profile of the user device (e.g., a user profile of the user of the user device).

In one example, the media platform may receive a content request from the user device, at block 1014. The media platform can generate the content at block 1012 in response to the content request from the user device at block 1014. For example, the content request may request the media platform to generate a story, a sharable form of another user's content on the media platform, a sharable status, etc. In another example, the media platform may generate the content based on a predetermined condition for the user profile (e.g., a status anniversary, a new friendship, etc.), at block 1014. Processing 1000 then proceeds to block 1020.

At block 1020, the content is applied with an interactive element embedded in the content to interact with the user device. The interactive element can be embedded into the content such that the interactive element does not result in a substantial change of other components in the content (e.g., does not substantially change the components 302, 304, 306 as shown in FIG. 3A). The interactive element in the content is configured to interact with the user device. While the content is being displayed on the user device, the interactive element reacts on demand. For example, the interactive element in the displayed content reacts on demand to sensing of the user device (e.g., reacts on demand to a user interaction with the user device that changes/impacts the sensing by the user device). The interactive element in the displayed content can dynamically react in real-time to the sensing by the user device. Processing 1000 can then proceed to block 1030.

At block 1030, the content with the embedded interactive element is provide to the user device. For example, the content platform provides the content with the embedded interactive element to the user device. In an embodiment, the content embedded with the interactive element may be provided by being transmitted to the user device. In another embodiment, the content embedded with the interactive element may be provided by being accessed on the media platform by the user device.

Figure 5:
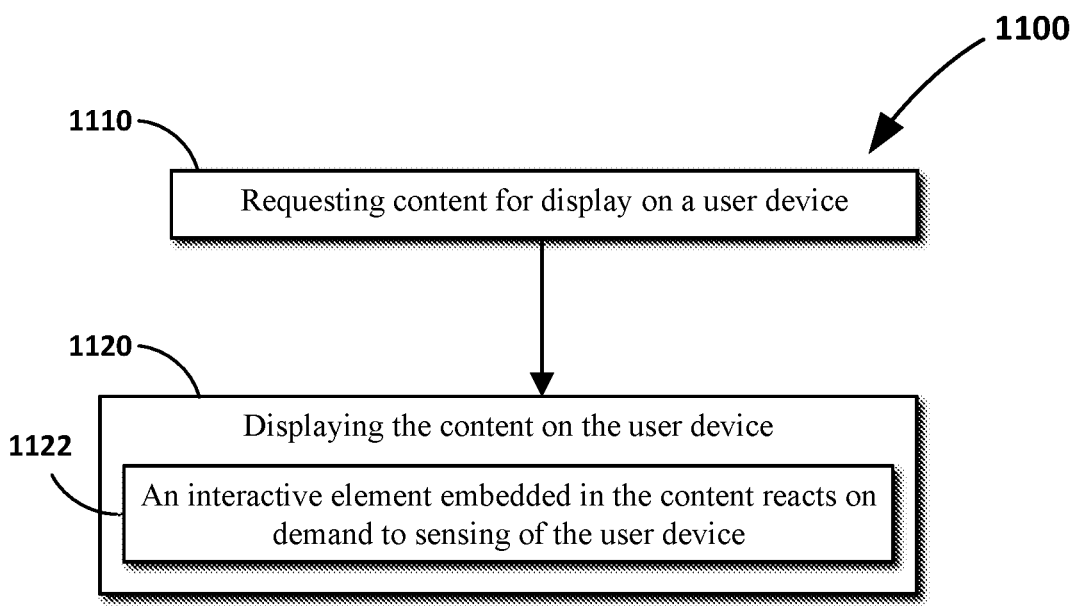
FIG. 5 shows a block flow chart for an embodiment of a process of obtaining content from a media platform.

FIG. 5 is a flow chart illustrating an example process 1100 for obtaining content from a media platform, in accordance with at least some embodiments described herein. Processing flow 1100 may include various operations, functions, or actions as illustrated by one or more of blocks 1110, 1120, 1122. These various operations, functions, or actions may, for example, correspond to software, program code, or program instructions executable by a processor that causes the functions to be performed. Processing 1000 may begin at block 1110.

At block 1110, the content is requested for display on a user device. The user device can request the content from the media platform. For example, as illustrated in the embodiment of FIG. 2, a media platform 202 can be implemented by the system 200 and a user device 250 can request content from the media platform (e.g., content request 292) for display on the user device 250. In an embodiment, the request at block 1110 may be a request by the user device to view content on the media platform. In an embodiment, the request at block 1110 may be a request by the user device for the media platform to provide the content to the user device for viewing. Processing 1100 can then proceed to block 1120.

At block 1120, the content is displayed on the user device. For example, as illustrated in the embodiment of FIG. 2, the content can be displayed on a display 258 of a user device 250. During the display of the content on the user device at block 1120, an interactive element embedded in the content reacts on demand to sensing by the user device at block 1122. The block 1120 can include sensing using the sensor (s) of the user device. For example, the interactive element in the displayed content reacts on demand to sensing by sensor(s) of the user device. The interactive element in the displayed content may react on demand in real-time to the sensing of the user device. This can allow the user to manipulate the user device to cause reacting of the interactive element embedded in the contend being displayed on the user device. In one embodiment, the real-time reacting of the interactive element may be used by the user to confirm that the content was generated on the media platform.

Figure 6:
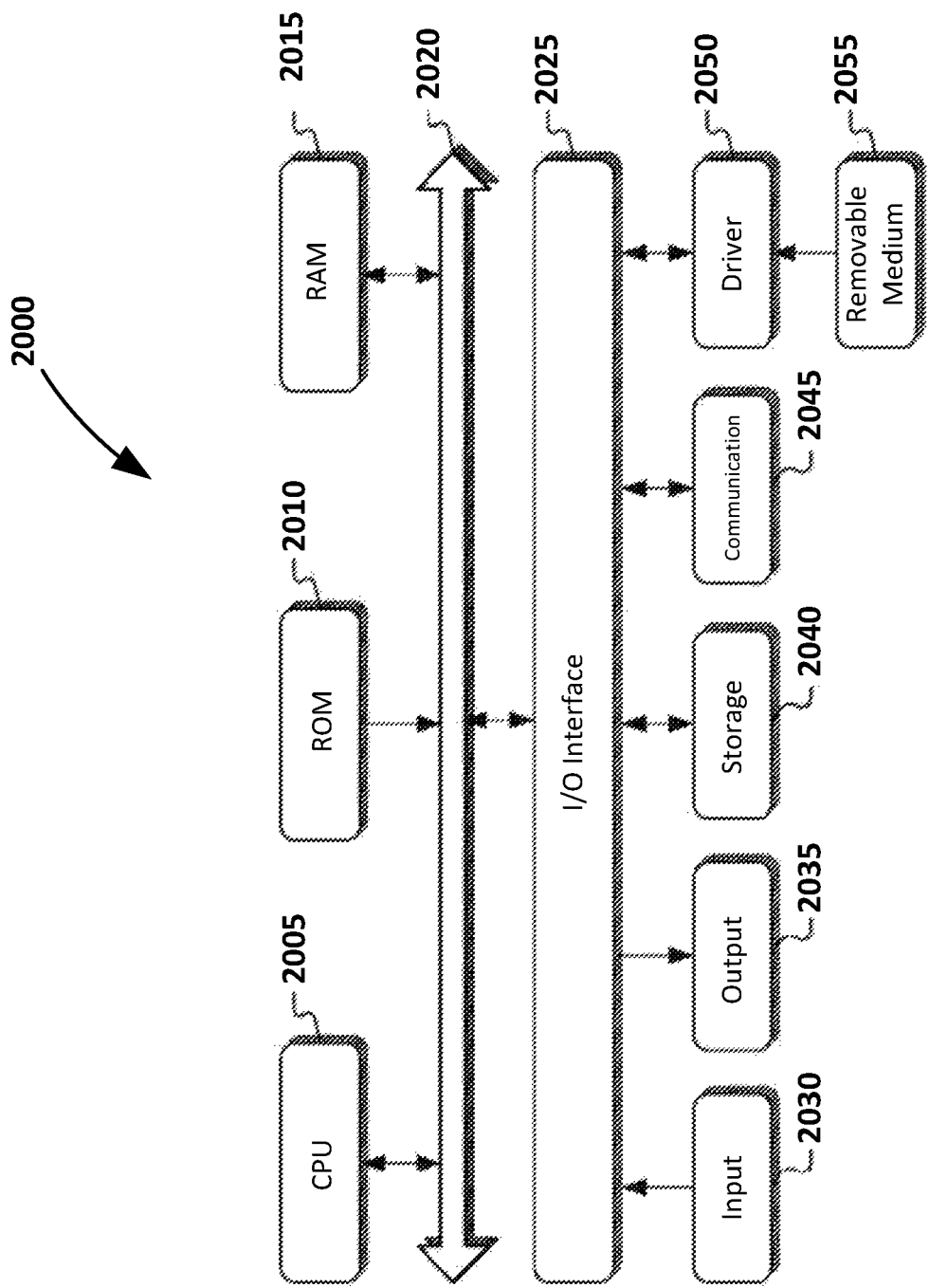
FIG. 6 is a schematic structural diagram of an embodiment of a computer system applicable to implementing an electronic device.

FIG. 6 is a schematic structural diagram of an example computer system 2000 applicable to implementing an electronic device (for example, the server 150 or one of the terminal devices 110, 120, 130, 140 shown in FIG. 1), arranged in accordance with at least some embodiments described herein. It is to be understood that the computer system shown in FIG. 6 is provided for illustration only instead of limiting the functions and applications of the embodiments described herein.

The computer-readable instructions may, for example, be executed by a processor of a device, as referenced herein, having a network element and/or any other device corresponding thereto, particularly as applicable to the applications and/or programs described above corresponding to system 100 to implement a media platform. It is to be understood that the computer system shown in FIG. 6 is provided for illustration only instead of limiting the functions and applications of the embodiments described herein.

As depicted, the computer system 2000 may include a central processing unit (CPU) 2005. The CPU 2005 may perform various operations and processing based on programs stored in a read-only memory (ROM) 2010 or programs loaded from a storage device 2040 to a random-access memory (RAM) 2015. The RAM 2015 may also store various data and programs required for operations of the system 2000. The CPU 2005, the ROM 2010, and the RAM 2015 may be connected to each other via a bus 2020. An input/output (I/O) interface 2025 may also be connected to the bus 2020.

The components connected to the I/O interface 2025 may further include an input device 2030 including a keyboard, a mouse, a digital pen, a drawing pad, or the like; an output device 2035 including a display such as a liquid crystal display, a speaker, or the like; a storage device 2040 including a hard disk or the like; and a communication device 2045 including a network interface card such as a LAN card, a modem, or the like. The communication device 2045 may perform communication processing via a network such as the Internet, a WAN, a LAN, a LIN, a cloud, etc. In an example embodiment, a driver 2050 may also be connected to the I/O interface 2050. A removable medium 2055 such as a magnetic disk, an optical disk, a magneto-optical disk, a semiconductor memory, or the like may be mounted on the driver 2050 as desired, such that a computer program read from the removable medium 2055 may be installed in the storage device 2040.

It is to be understood that the processes described with reference to the flowcharts and/or processes described in other figures may be implemented as computer software programs or in hardware. The computer program product may include a computer program stored in a computer readable non-volatile medium. The computer program includes program codes for performing the method shown in the flowcharts.

In this embodiment, the computer program may be downloaded and installed from the network via the communication device 2045, and/or may be installed from the removable medium 2055. The computer program, when being executed by the central processing unit (CPU) 2005, can implement the above functions specified in the methods in the embodiments disclosed herein.

It is to be understood that the disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., a field programmable gate array, an application specific integrated circuit, or the like.

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory, electrically erasable programmable read-only memory, and flash memory devices; magnetic disks, e.g., internal hard disks or removable disks; magneto optical disks; and compact disc read-only memory and digital video disc read-only memory disks. The processor and the memory can be supplemented by, or incorporated in, special purpose logic circuitry.

It is to be understood that different features, variations and multiple different embodiments have been shown and described with various details. What has been described in this application at times in terms of specific embodiments is done for illustrative purposes only and without the intent to limit or suggest that what has been conceived is only one particular embodiment or specific embodiments. It is to be understood that this disclosure is not limited to any single specific embodiments or enumerated variations. Many modifications, variations and other embodiments will come to mind of those skilled in the art, and which are intended to be and are in fact covered by both this disclosure. It is indeed intended that the scope of this disclosure should be determined by a proper legal interpretation and construction of the disclosure, including equivalents, as understood by those of skill in the art relying upon the complete disclosure present at the time of filing.

Aspects

Any of Aspects 1-13 may be combined with any of Aspects 14-28, any of Aspects 14-23 may be combined with any of Aspects 24-28, any of Aspects 24-25 may be combined with any of Aspects 26-28, Aspect 26 may be combined with any of Aspects 27-28, and Aspect 27 may be combined with Aspect 28.

Aspect 1. A method of displaying content on a media platform, comprising: obtaining the content for display to a user device; and applying an interactive element embedded into the content to interact with the user device, thereby allowing the interactive element to react on demand while displaying the content on the user device.

Aspect 2. The method of Aspect 1, wherein the interactive element dynamically reacts on demand.

Aspect 3. The method of any one of Aspects 1-2, wherein the interactive element dynamically reacts on demand in response to changes in real-time sensing by the user device, the changes in the real-time sensing of the user device caused by a user interaction with the user device.

Aspect 4. The method of any one of Aspects 1-3, wherein the interactive element reacts on demand in response to sensing by one or more sensors of the user device.

Aspect 5. The method of Aspect 4, wherein the interactive element reacts on demand in real-time to the sensing by the one or more sensors.

Aspect 6. The method of Aspect 5, wherein the content contains one or more visual components that do not react to the sensing by the one or more sensors.

Aspect 7. The method of any one of Aspects 4-6, wherein the interactive element reacts on demand in response to changes in the sensing by the one or more sensors.

Aspect 8. The method of any one of Aspects 1-7, wherein the interactive element reacts on demand to motion sensing by one or more motion sensors of the user device.

Aspect 9. The method of any one of Aspects 1-8, wherein the obtaining of the content includes generating the content on the media platform.

Aspect 10. The method of any one of Aspects 1-9, wherein the interactive element is embedded into the content forming an integral object.

Aspect 11. The method of any one of Aspects 1-10, wherein the interactive element is embedded as an overlay.

Aspect 12. The method of any one of Aspects 1-11, wherein the interactive element includes an interactive visual component, wherein the interactive element reacting on demand includes changing of one or more visual properties of the interactive visual component of the interactive element.

Aspect 13. The method of any one of Aspects 1-12, wherein the interactive visual component is one or more of a shimmer effect, a parallax effect, a pulsing glow effect, and a color scheme effect.

Aspect 14. A method of obtaining content from a media platform, comprising: requesting the content for display on a user device, the user device including one or more sensors; displaying the content on the user device, during which an interactive element embedded in the content reacts on demand in response to sensing by the one or more sensors.

Aspect 15. The method of Aspect 14, further comprising: sensing, with the one or more sensors, for a user interaction with the user device, wherein the interactive element embedded in the content reacts on demand in response to the sensing by the one or more sensors of the user interaction with the user device.

Aspect 16. The method of any one of Aspects 14-15, wherein the interactive element dynamically reacts on demand.

Aspect 17. The method of Aspect 16, wherein the interactive element dynamically reacts on demand in response to changes in real-time sensing by the user device, the changes in the real-time sensing of the user device caused by a user interaction with the user device.

Aspect 18. The method of any one of Aspects 14-17, wherein the content contains one or more visual components that do not react to the sensing by the one or more sensors.

Aspect 19. The method of any one of Aspects 14-18, wherein the one or more sensors of the user device include one or more motion sensors, and the interactive element reacts on demand to motion sensing by the one or more motion sensors of the user device.

Aspect 20. The method of any one of Aspects 14-19, wherein the interactive element is embedded into the content forming an integral object, and the user device receives the integral object from the media platform.

Aspect 21. The method of any one of Aspects 14-20, wherein the interactive element includes an interactive visual component, wherein the interactive element reacting on demand includes changing of one or more visual properties of the interactive visual component of the interactive element.

Aspect 22. The method of Aspect 21, wherein the interactive element is embedded as an overlay.

Aspect 23. The method of any one of Aspects 21-22, wherein the interactive visual component is one or more of a shimmer effect, a parallax effect, a pulsing glow effect, and a color scheme effect.

Aspect 24. A system to provide content on a media platform, the system comprising: a memory configured to store data; a processor configured to read the data from the memory and further configured to: obtain the content for display to a user device; and applying an interactive element embedded into the content to interact with the user device, thereby allowing the interactive element to react on demand while displaying the content on the user device.

Aspect 25. The system of Aspect 24, the processor further configured to provide the content embedded with interactive element to the display device.

Aspect 26. A non-transitory computer-readable storage medium having a computer program stored thereon which when, executed by a processing device, performs the steps: obtaining content for display to a user device; and applying an interactive element embedded into the content to interact with the user device, thereby allowing the interactive element to react on demand while displaying the content on the user device.

Aspect 27. A user device for displaying content from a media platform, the user device comprising: a memory configured to store data; one or more sensors; and a processor configured to read the data from the memory and further configured to: request the content for display on a user device, and display the content on the user device, during which an interactive element embedded in the content reacts on demand in response to sensing by the one or more sensors of the user device.

Aspect 28. A non-transitory computer-readable storage medium having a computer program stored thereon which when, executed by a processing device, performs the steps: requesting content from a media platform for display on a user device, the user device having one or more sensors; and displaying the content on the user device, during which an interactive element embedded in the content reacts on demand in response to sensing by the one or more sensors.

The terminology used herein is intended to describe particular embodiments and is not intended to be limiting. The terms "a," "an," and "the" include the plural forms as well, unless clearly indicated otherwise. The terms "comprises" and/or "comprising," when used in this Specification, specify the presence of the stated features, integers, steps, operations, elements, and/or components, but do not preclude the presence or addition of one or more other features, integers, steps, operations, elements, and/or components. In an embodiment, "connected" and "connecting" as described herein can refer to being "directly connected" and "directly connecting".

With regard to the preceding description, it is to be understood that changes may be made in detail, especially in matters of the construction materials employed and the shape, size, and arrangement of parts without departing from the scope of the present disclosure. This Specification and the embodiments described are exemplary only, with the true scope and spirit of the disclosure being indicated by the claims that follow.

What is claimed is:

1. A method of displaying content on a media platform, comprising:
    obtaining the content for display to a user device; and
    applying an interactive element embedded into the content to interact with the user device, thereby allowing the interactive element to dynamically react on demand in response to changes in real-time sensing by one or more sensors of the user device while displaying the content on the user device, wherein the interactive element is embedded as an overlay, and wherein the interactive element dynamically reacting on demand includes changing one or more visual properties of an interactive visual component of the interactive element in response to the real-time sensing by the user device while the content for display contains one or more visual components that do not react to the sensing by the one or more sensors, the interactive element dynamically reacting on demand while the one or more visual components of the content are being displayed on the user device.

2. The method of claim 1, wherein the changes in the real-time sensing of the user device are caused by a user interaction with the user device.

3. The method of claim 1, wherein the interactive element dynamically reacts on demand in response to motion sensing by one or more motion sensors of the user device, the real-time sensing by the user device including the motion sensing by the one or more motion sensors of the user device.

4. The method of claim 1, wherein the obtaining of the content includes generating the content on the media platform.

5. The method of claim 1, wherein the interactive element is embedded into the content forming an integral object.

6. The method of claim 1, wherein the interactive visual component is one or more of a shimmer effect, a parallax effect, a pulsing glow effect, and a color scheme effect.

7. The method of claim 1, wherein the interactive element dynamically reacts on demand in response to changes in the real-time sensing by the user device includes the interactive element changing synchronously with the changes in the real-time sensing by the user device.

8. The method of claim 1, wherein the interactive element dynamically reacts in real-time to the real-time sensor data.

9. A method of obtaining content from a media platform, comprising:
 requesting the content for display on a user device, the user device including one or more sensors; and
 displaying the content on the user device, during which an interactive element embedded in the content dynamically reacts on demand in response to changes in real-time sensing by the one or more sensors, wherein the interactive element is embedded as an overlay, and wherein the interactive element dynamically reacting on demand includes changing one or more visual properties of an interactive visual component of the interactive element in response to the real-time sensing by the user device while the content for display contains one or more visual components that do not react to the sensing by the one or more sensors, the one or more visual components being displayed while the interactive element dynamically is reacting on demand.

10. The method of claim 9, further comprising:
 sensing, with the one or more sensors, for a user interaction with the user device, wherein the real-time sensing by the user device includes the sensing by the one or more sensors of the user interaction with the user device.

11. The method of claim 10, wherein the changes in the real-time sensing of the user device are caused by the user interaction with the user device.

12. The method of claim 9, wherein the one or more sensors of the user device include one or more motion sensors, the interactive element dynamically reacts on demand in response to motion sensing by the one or more motion sensors of the user device, and the real-time sensing includes the motion sensing.

13. A system to provide content on a media platform, the system comprising:
 a memory configured to store data;
 a processor configured to read the data from the memory and further configured to:
  obtain the content for display to a user device; and
  apply an interactive element embedded into the content to interact with the user device, thereby allowing the interactive element to dynamically react on demand to changes in real-time sensing by one or more sensors of the user device while displaying the content on the user device, wherein the interactive element is embedded as an overlay, and wherein the interactive element dynamically reacting on demand includes changing one or more visual properties of an interactive visual component of the interactive element in response to the real-time sensing by the user device while the content for display contains one or more visual components that do not react to the sensing by the one or more sensors, the interactive element dynamically reacting on demand while the one or more visual components of the content are being displayed on the user device.

* * * * *